United States Patent [19]

Rocholl et al.

[11] Patent Number: 4,833,975
[45] Date of Patent: May 30, 1989

[54] INTEGRATED MANUAL BRAKE DEVICE

[75] Inventors: Hans Rocholl; Horst Klein, both of Remscheid, Fed. Rep. of Germany

[73] Assignee: Bergische Stahl-Industrie, Fed. Rep. of Germany

[21] Appl. No.: 62,771

[22] Filed: Jun. 15, 1987

[30] Foreign Application Priority Data

Jun. 27, 1986 [DE] Fed. Rep. of Germany ....... 3621638

[51] Int. Cl.⁴ ............................................... F01B 7/00
[52] U.S. Cl. ........................................... 92/63; 92/61; 92/130 R; 92/29; 188/202
[58] Field of Search ................ 92/62, 63, 65, 109, 92/113, 132, 133, 13, 13.3, 13.4, 13.51, 13.6, 13.7, 13.8, 14; 188/202, 203, 196 D, 196 R, 71.9

[56] References Cited

U.S. PATENT DOCUMENTS

| 3,285,375 | 11/1966 | Jeppsson et al. | 188/202 |
| 3,482,662 | 12/1969 | Bruhn et al. | 188/203 |
| 3,891,067 | 6/1975 | Axelsson | 188/203 |
| 4,005,767 | 2/1977 | Farello | 188/203 |
| 4,478,319 | 10/1984 | Casalone et al. | 188/202 |
| 4,593,797 | 6/1986 | Schmitt | 188/202 |
| 4,635,762 | 1/1987 | Nilsson et al. | 188/203 |
| 4,676,346 | 6/1987 | Barberis | 188/202 |

FOREIGN PATENT DOCUMENTS

| 842593 | 5/1970 | Canada | 188/196 D |
| 2608706 | 10/1976 | Fed. Rep. of Germany | 188/202 |
| 2736531 | 8/1978 | Fed. Rep. of Germany | 188/202 |
| 2304831 | 10/1976 | France | 188/196 D |
| 1192338 | 5/1970 | United Kingdom | 188/203 |

Primary Examiner—Edward K. Look
Assistant Examiner—Thomas Denion
Attorney, Agent, or Firm—McGlew & Tuttle

[57] ABSTRACT

An integrated manual brake device on a brake actuation unit, particularly for rail vehicles, and it includes a hydraulic or pneumatic cylinder. The brake actuation unit contains a linkage setter including two parts displaceable relative to each other in a telescopic fashion. One of the parts is formed as a threaded spindle and the other tubular part is firmly connected with a nut which is screwed on the spindle with a nonselflocking thread. A stop is provided on the tubular part fixed in an axial direction but easily turnable. An actuating spring is clamped between the piston and the output part.

5 Claims, 1 Drawing Sheet

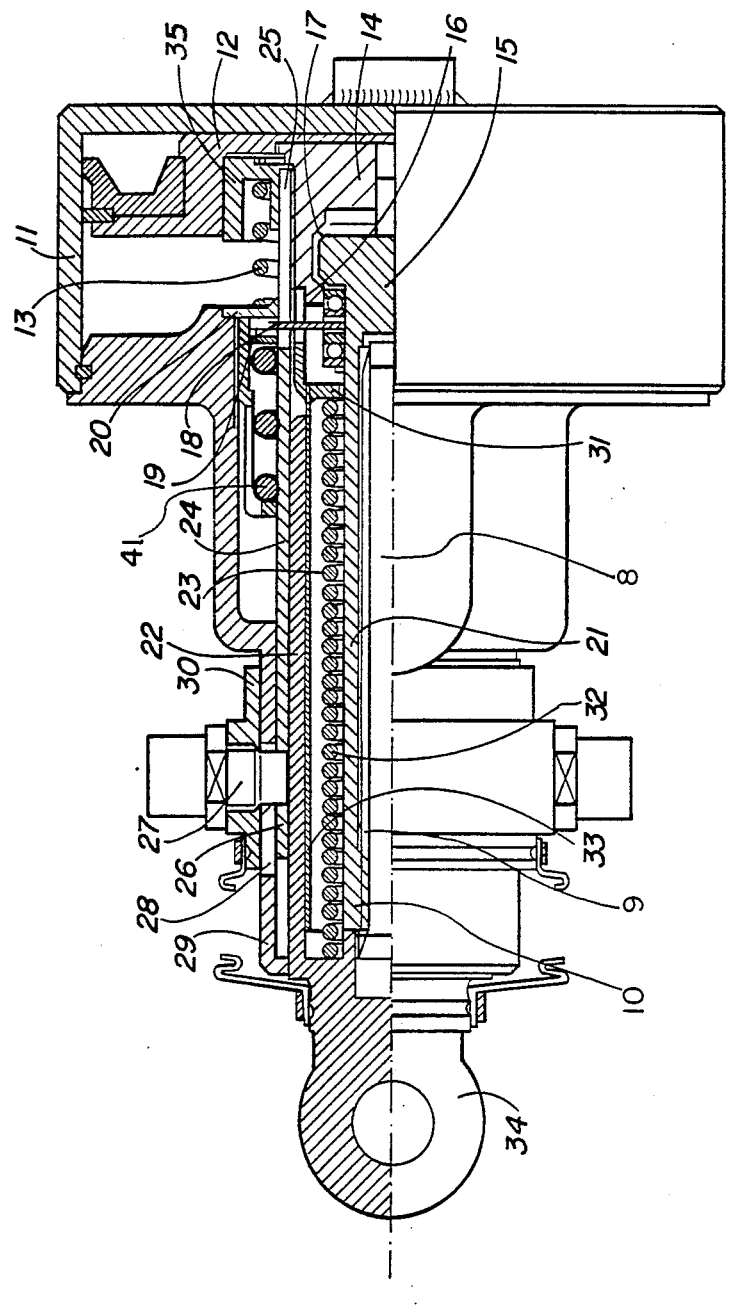

4,833,975

INTEGRATED MANUAL BRAKE DEVICE

BACKGROUND OF THE INVENTION

Field of the Invention

This invention relates in general to braking devices and in particular to a new and useful braking device for rail vehicles which is manually operated.

The invention relates to an integrated manual brake device on a brake actuation unit, in particular for rail vehicles, with a hydraulic or pneumatic cylinder, the brake actuation unit containing a linkage setter including two parts displaceable relatively to each other in telescope fashion, of which one part is formed as a threaded spindle and the other tubular part is firmly connected with a nut which is screwed on the spindle with a non-selflocking thread, and a stop being provided on the tubular part fixed in axial direction but easily turnable, and with an actuating spring being clamped between the piston and the output part.

In such actuating devices it is always difficult to provide a manual brake device which, while functioning safely, is not too complex, whereby the weight would be greatly increased. Usually, therefore, an additional light brake has been provided on the back of the piston for the manual brake, so that the linkage resetting device is isolated or stands alone and can operate satisfactorily. But because of shortage of space, the manual brake should be arranged also at the resetting device.

The present invention provides a device which avoids the known disadvantages of the known devices and provides an equipment which can easily be integrated in the actuating unit, yet requires no complex additional devices.

In accordance with the invention the outside of the tubular part embracing the actuating spring is provided with a manual brake tube which applies with a sliding fit, one end of which is firmly connected with the piston of the actuating cylinder or respectively with an insert displaceably mounted therein, while at its other end a bolt, pin or the like being brought out approximately radially through the housing is articulated.

Appropriately the bolt, pin, etc. is movable axis-parallel on the housing by means of a sleeve, a ring, etc.

The advantage of this design according to the invention resides in that, to operate the manual brake, only one additional tube must be arranged in the actuating unit, which tube is easy to displace in longitudinal directions along the sleeve, etc. mounted on the housing of the actuating unit.

Accordingly it is an object of the invention for an integrated manual braking device on a brake actuating unit for rail vehicles which includes a fluid pressure cylinder with a brake arrangement in which a linkage setter includes two parts displaceable relative to each other in a telescopic fashion, with one part being formed as a threaded spindle and the other part being attached to a nut engaged on a spindle with their being a stop provided on the tubular part fixed in an axial direction which includes an actuating spring which is clamped between the piston and the output part.

A further object of the invention is to provide a integrated manual brake device which is simple in design, rugged in construction and economical to manufacture.

The various features of novelty which characterize the invention are pointed out with particularity in the claims annexed to and forming a part of this disclosure. For a better understanding of the invention, its operating advantges and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a partial elevational and partial axial sectional view of a integrated manual brake device constructed in accordance with the invention.

GENERAL DESCRIPTION OF THE PREFERRED EMBODIMENT

Referring to the drawing in particular, the invention embodied therein comprises an integrated manual brake device on a brake actuation unit particular for a rail vehicle which includes a fluid pressure cylinder housing 29.

The drawing illustrates an embodiment of the invention which is used for an actuating unit with a hydraulic cylinder and a linkage setter comprising two telescopic parts, one of which comprises a threaded spindle 8 with a non-self-locking thread 9 and the other comprises a nut 10 in threaded engagement with the spindle and having a tubular part 21 with a flange 15 at an end of the tubular part 21 remote from the nut 10. A piston 12 mounted in a cylinder 11 is held by a return spring 13 in the inoperative position shown in the drawing. Applied on the piston 12 is a projection 14 having a recess which receives the flange 15 and forms therewith two coupling pairs 16 and 17. Together with a stop 18, which extends approximately radially between two abutments 19 and 20, these coupling pairs 16 and 17 form an essential part of the resetting device. The stop 18 is mounted on the tubular part 21 axially fixed but easily turnable, the flange 15 being arranged at the end of the tubular part 21. On an outer tube 22, which together with the tubular part 21 forms a space 23 for an actuating spring 32, a manual brake tube 24 lies in a sliding fit and is screw fitted to the piston 12. At the other end 26 of the manual brake tube 24, bolts 27 or pins extending radially outward are provided, each able to be displaced in a longitudinal slot 28 of the housing 29, the guiding of this bolt 27 being performed by a ring or sleeve 30 mounted on the housing 29.

To actuate the manual brake it now suffices to displace the manual brake tube 26 by means of the bolts 27 in the slot 28, whereby the piston 12 is displaced as well, and this then results in the same effect as when the piston is displaced by the pressure medium. Initial displacement of the brake tube 26 to the left causes an initial movement of the output bolt 34 leftwards to take up any slack as a result of the projection 14 moving the abutment 31 to the left and compressing the activating spring 32 which pushes the bolt carrying the threaded spindle 8, the nut 10, tubular part 21 and flange 15 together with the stop 18 to the left. During such initial movement, rotation of the nut 10 on the spindle 8 is prevented by engagement of the coupling pairs 16.

In the event of excessive slack, the stop 18 will be brought into engagement with the abutment 19 prior to any back pressure on the output bolt 34 from brake engagement, the pressure of spring 41 on the abutment 19 resisting further movement of the flange 15 to the left while the output bolt 34 and spindle continue to be advanced by the force of activating spring 32. This releases the coupling pairs 16 freeing flange 15, tubular part 21 and nut 10 for rotation by the engagement of the nut 10 with the thread 9 of the spindle, such rotation accommodating further advance of the eye bolt. When coupling pair 17 is brought into engagement, as by the abutment with the brake linings when all slack has been taken up, the full braking force is applied with further depression of spring 41 acting on abutment 19.

The release of the manual brake causes the projection 14 to be moved back to the position shown in the drawing by return spring 13, releasing coupling pair 17 and engaging coupling pair 16. As the eye-bolt 34 has been advanced to the left relative to the flange 15 during application of the brake, the excessive slack has been taken up and the linkage readjusted for a correct amount of slack with stop 27 being located between the abutments in an appropriate correct clearance position.

This then means also that with the actuation of the manual brake readjustment of the linkage occurs. Readjustment, therefore, takes place with all movements of the piston 12, whether in operational braking or with an actuation of the manual brake. This is an essential advantage of the device according to the invention, because this effect can be obtained without major weight increase of the brake actuation unit.

In other cases it may be desirable to avoid movement of the piston 12 upon the actuation of the manual brake. In this case there is mounted displaceable in the piston 12 an insert 35 which is connected with the end 25 of the manual brake tube 24, the insert 35 being attached on the projection 14 mounted displaceably in piston 12. Then, too, readjustment takes place upon actuation of the manual brake.

A special further advantage is that the manual brake tube 24 according to the invention takes over guiding tasks in axial as well as in concentric directions and acts as protection against rotation of the piston 12.

Of course, the manual brake tube 24 is no longer a solid tube but comprises individual segments which, like the tube, are secured on the piston 12 and on the bolt 27.

An abutment 31 for the actuating spring 32 forms part of a guide sleeve 33, whereby one achieves the guiding and avoids buckling of the spring 32 when the eye or eyebolt 34 which functions as output part is moved far out of the housing 29 because of very great readjustment.

While a specific embodiment of the invention has been shown and described in detail to illustrate the application of the principles of the invention, it will be understood that the invention may be embodied otherwise without departing from such principles.

What is claimed is:

1. Integrated manual brake device on a brake actuation unit, in particular for rail vehicles, comprising a fluid pressure operated cylinder housing, a brake actuation unit containing a linkage setter of two parts displaceable relative to each other in telescopic fashion including a first part formed as a threaded spindle, a nut threaded on said spindle, and the other part being tubular and permanently connected to said nut which is threaded on said spindle, said spindle having a non-selflocking thread, and a stop being provided on said other tubular part fixed in an axial direction but easily turnable, an actuating cylinder, a piston in said actuating cylinder, an output part having a tubular portion, an actuation spring within said tubular portion of the output part, an insert displaceably mounted and the actuation spring being clamped between said piston and said output part on the outside of said tubular part embracing said actuating spring, a manual brake tube forming a sliding fit on said tubular portion and having its one end connected with said piston, within said actuating cylinder and said insert, a bolt on the other end of said manual brake tube extending radially out of said housing.

2. An integrated manual brake according to claim 1, including a ring around said housing having a bolt which is moveable axis-parallel to said housing.

3. An integrated manual brake device according to claim 1 in which said manual brake tube is divided into a plurality of segments which are connected with said piston, said piston having a projection thereon effecting the connection to said brake tube.

4. Integrated manual brake device on a brake actuation unit, in particular for rail vehicles, comprising a fluid pressure operated cylinder housing, a brake actuation unit containing a linkage setter of two parts displaceable relative to each other in telescopic fashion including a first part formed as a threaded spindle, a nut threaded on said spindle, and the other part being tubular and permanently connected to said nut which is threaded on said spindle, said spindle having a non-self locking thread, and a stop being provided on said other, tubular, part fixed in an axial direction but easily turnable, an actuating cylinder, a piston in said actuating cylinder, an output part having a tubular portion extending coaxially around the other tubular part, an actuation spring trapped between said tubular portion and the other tubular part, first and second tubular inserts mounted in the housing for relative axial displacement, the first insert being mounted on the other tubular part within the tubular portion of the output part and the second insert being axially aligned between the piston and the first insert and axially movable relative to the piston, the actuation spring being radially trapped by the first insert between the first insert and the other tubular part and axially clamped between the output part and the first insert so as to urge the first and second inserts into axial engagement with each other thereby to transmit take up from movement of the piston to the output part, a manual brake tube forming a sliding fit on said tubular portion and having one end connected with said piston, a bolt on the other end of said manual brake tube extending radially out of said housing.

5. An integrated manual brake device according to claim 4 in which the second insert carries coupling surfaces directed in opposite axial senses to each other, an axial end of the other tubular part being formed with coupling surfaces directed in opposite axial senses to each other and complementary to respective of the first coupling surfaces so that the coupling surfaces carried by the second insert are brought alternately into engagement with the complementary surfaces of the other tubular part in a braking and release condition of the brake respectively.

* * * * *